United States Patent
Lin

(10) Patent No.: US 9,264,539 B2
(45) Date of Patent: Feb. 16, 2016

(54) AUTHENTICATION METHOD AND SYSTEM FOR SCREENING NETWORK CALLER ID SPOOFS AND MALICIOUS PHONE CALLS

(71) Applicant: Chung-Yu Lin, Kaohsiung (TW)

(72) Inventor: Chung-Yu Lin, Kaohsiung (TW)

( * ) Notice: Subject to any disclaimer, the term of this patent is extended or adjusted under 35 U.S.C. 154(b) by 0 days.

(21) Appl. No.: 14/584,405

(22) Filed: Dec. 29, 2014

(65) Prior Publication Data

US 2015/0189080 A1 Jul. 2, 2015

Related U.S. Application Data

(60) Provisional application No. 61/922,941, filed on Jan. 2, 2014.

(51) Int. Cl.
| | |
|---|---|
| H04M 1/56 | (2006.01) |
| H04M 15/06 | (2006.01) |
| H04M 3/436 | (2006.01) |
| H04M 3/42 | (2006.01) |

(52) U.S. Cl.
CPC ............ *H04M 3/436* (2013.01); *H04M 3/4365* (2013.01); *H04M 3/42059* (2013.01); *H04M 2203/6027* (2013.01); *H04M 2203/6045* (2013.01)

(58) Field of Classification Search
CPC . H04L 63/08; H04L 63/0823; H04L 63/1441; H04L 3/1483; H04L 65/1079; H04L 2209/56; H04L 9/3215; H04M 1/57; H04M 2203/6081; H04M 3/42059; H04M 1/575; H04M 3/42042; H04M 3/436; G06F 21/32; G06F 21/33; G06F 2221/2111; G06F 2221/2137; G06F 2221/2151; G06Q 20/367; G06Q 20/3821; G07B 5/00

USPC ............ 379/142.01, 142.04, 142.05, 142.06, 379/142.07; 340/5.8, 5.81, 5.85; 713/155, 713/156, 168, 170; 726/3, 4, 8

See application file for complete search history.

(56) References Cited

U.S. PATENT DOCUMENTS

| | | | | |
|---|---|---|---|---|
| 6,792,531 | B2 * | 9/2004 | Heiden | G06F 21/33 380/30 |
| 8,290,130 | B2 * | 10/2012 | Cheon | H04M 3/436 379/142.05 |
| 2002/0056050 | A1 * | 5/2002 | Heiden | G06F 21/33 726/10 |
| 2007/0022469 | A1 * | 1/2007 | Cooper | H04K 1/00 726/3 |
| 2007/0248220 | A1 * | 10/2007 | Crandell | H04L 51/12 379/142.05 |
| 2008/0159488 | A1 * | 7/2008 | Raja | G10L 17/24 379/88.02 |
| 2008/0181379 | A1 | 7/2008 | Chow et al. | |
| 2008/0228653 | A1 * | 9/2008 | Holdsworth | G06F 21/34 705/67 |

(Continued)

*Primary Examiner* — Binh Tieu
(74) *Attorney, Agent, or Firm* — Bacon & Thomas, PLLC

(57) ABSTRACT

An authentication method and system for screening network caller ID spoofs and malicious phone calls includes a screening authentication system with a server that includes a login register interface, a data accessing interface, a data searching and comparing program, a data searching database, a labeling indication program, a registry coding module and a data searching coding module. Authentication data is generated by the registry coding module from a caller telephone number and caller login identification data input during registration. Corresponding authentication data contained in a network calling signal from a caller sending device is generated by a data searching coding module. A data searching and comparing program compares the authentication data and, if any discrepancy is found, a labeling indication program sends a "failed authentication" signal to the target network receiving callee so that a fraudulent call is detected.

24 Claims, 4 Drawing Sheets

(56) References Cited

U.S. PATENT DOCUMENTS

2012/0256725 A1* 10/2012 Hayashi ............... G06F 21/32
340/5.81

2012/0287823 A1* 11/2012 Lin ................... H04M 3/42042
370/259
2015/0063552 A1* 3/2015 Bender ................. H04L 9/3215
379/142.05

* cited by examiner

```
INVITE sip:111@111.222.333.444 SIP/2.0
Via: SIP/2.0/UDP 111.222.333.443:5060;branch=z9hG4bKtiop3
Via: SIP/2.0/UDP 111.222.333.442:5060;branch=z9hG4bK83842.1
Via: SIP/2.0/UDP 111.222.333.441:5060;branch=z9hG4bKmp17a
To: 0911111111 <sip:111@111.222.333.444>
From: 0922222222 <sip:222@aaa.com>;tag=42
Subject: Where are you exactly?
Contact: <sip:222@111.222.333.441>
```

FIG.4

AUTHENTICATION METHOD AND SYSTEM FOR SCREENING NETWORK CALLER ID SPOOFS AND MALICIOUS PHONE CALLS

This application claims the benefit of provisional U.S. Patent Application No. 61/922,941, filed Jan. 2, 2014, and incorporated herein by reference.

FIELD OF THE PRESENT INVENTION

The present invention relates to an authentication system for screening network caller ID spoofs and malicious phone calls, and particularly to one that uses the security advantage provided by the Distributed Data Acquisition and Control System (DACS) to enhance authentication reliability and effectiveness and prevent a distributed denial-of-service (DDoS) attack so that telecommunication information security for the network calling user is substantially reinforced and enhanced. A data searching and comparing program performs identity comparison between authentication data generated from a caller telephone number and caller login authentication data input during registration and corresponding authentication data contained in a network calling signal from a caller sending device. If any discrepancy in the identity comparison is found, a labeling indication program sends a labeling indication signal with a "failed authentication" message to the target network receiving callee so that the network receiving callee can differentiate whether the incoming call is a fraudulent call.

BACKGROUND OF THE INVENTION

Since about 2000, telephone fraud has greatly increased in Taiwan and furthermore has spread to mainland China in the last three years. As a result, total monetary loss and the number of victims of telephone fraud has consistently soared every year. In order to prevent the public from suffering telephone fraud, the superintending government agency in charge of telecommunication, the National Communications Commission of Taiwan (NCC), has promulgated a regulation that telecommunication companies and international Internet Service Providers (ISPs) are obliged to set up authenticating and blocking mechanism against overseas incoming telephone calls, for screening and blocking certain telephone numbers from specific caller identities.

However, due to the ever-changing techniques of telephone fraud, most telephone fraudsters can easily tamper with a telephone number of the caller ID device to be displayed on the callee display screen. A gangster or crime syndicate can easily cheat and evade the existing authenticating and blocking mechanisms applied to incoming overseas incoming telephone calls, which have been established by the telecommunication companies and ISPs by sending fake telephone numbers in the caller ID in order to masquerade as trustworthy entities such as a government agency, local court, regional prosecutor's office, or the like, to cause callee victims to suffer from caller ID spoofing once again.

Telephone fraud is a part of the communications fraud used to deceive users by viciously exploiting the usability of current web security technologies including the Signaling System No. 7 (SS7) telephony signaling protocol set, which is used to set up most of the world's public switched telephone network (PSTN) telephone calls. Currently, all overseas telephone transmissions carried by the telecommunication industries in every country are gradually being moved to networks for reducing transmission cost, so that the overseas telephone transmissions are blended with network transmissions. Therefore, the regulations of the National Communications Commission of Taiwan (NCC) to establish blocking technology against international telephone fraud have been ineffective in screening and blocking certain tampered telephone numbers of fraudsters, who use fake caller-ID data to give the appearance that calls come from overseas, such as from Mainland China, while actually having a domestic origin in Taiwan. Moreover, efforts at developing effective blocking technology have so far failed as a result of the following problems.

1. Invalid Filtering:

Because caller ID telephone numbers can easily be tampered with via current web technologies to allow caller ID spoofing by the fraudsters, the telephone fraud gangster or syndicate can effortlessly cheat and evade existing authenticating and blocking mechanism against incoming telephone call set up by the telecommunication companies and ISPs by arbitrarily changing the telephone number of the caller ID.

2. Undue Blocking:

Because the existing authenticating and blocking mechanism against incoming telephone call set up by the telecommunication companies and ISPs directly blocks any doubtful telephone call from any suspicious caller ID, some legal telephone calls might be wrongly blocked due to lack of a caller telephone number or an incomplete caller telephone number resulting from lack of a country code or the like, which might be misjudged as a fraudulent phone call so that it is improperly hindered.

3. Industry Protest:

As a result of the foregoing "undue blocking," some harmful effects may subsequently be incurred. First, the number of customer complaints is increased, resulting in goodwill damage and escalation of customer service costs. Second, annual revenue of telephone transmissions is decreased. Accordingly, the telecommunication companies and ISPs have no incentive to enthusiastically cooperate with the National Communications Commission of Taiwan (NCC) and are reluctant to comply with the foregoing regulation stipulated by the National Communications Commission NCC.

4. Public Confusion:

For efficiency in preventing telephone fraud, comprehensive blocking of all doubtful telephone calls from any suspicious caller ID is the most effective way. However, the inconvenience of communication incurred by the above-mentioned "undue blocking" will disturb legitimate callers and callees alike. Contrarily, the good intention of the government in urging the Telecommunication Companies and ISPs to prevent telephone fraud easily becomes a source of people's grievances.

Accordingly, since telephone fraudsters continue to be equipped with network and cyber techniques for tampering with caller ID telephone numbers by masquerading as a trustworthy entity or government agency, the ordinary callee is unable to authenticate whether an incoming telephone call is genuine or a sham. Therefore, there is an urgent need for an effective authentication method and system for screening network caller ID spoofs and malicious phone calls without any of the problems mentioned above, so that the telecommunication companies and ISPs will be happy and willing to implement the system and method to practically preventing telephone fraud.

U.S. patent application Ser. No. 11/699,330 (Publication number US2008/0181379) entitled "Caller Name Authentication to Prevent Caller Identity Spoofing" discloses a separate caller name authentication mechanism to perform user name authentication. However, this authentication mechanism requires triple redundant means to implement the authentication mechanism, meaning that a telecommunication company and ISP must set up an extra authentication system in addition to the existing telecommunication facility; the telecommunication user is required to set up an extra auxiliary authentication device in addition to the existing telephone facility; and in practice, an extra auxiliary authentication channel must be set up in addition to the existing telecommunication channel. This results in extra costs and problems with system compatibility and communication efficiency, with the result that the chance of adoption is unfavorable.

Therefore, there is still a need for an effective authentication method and system for screening network caller ID spoofs and malicious phone calls, which can be constructed using existing telecommunication facility infrastructure that does not require an extra auxiliary device to be set up in addition to the existing telephone facility for the user, and that also does not require an extra auxiliary channel to be set up in addition to the existing telecommunication channel, thereby providing a favorable economic effect, system compatibility and communication efficiency, to address a critical demand for practically preventing telephone fraud.

Furthermore, during practical implementation of an embodiment of the authentication method and system, there is an urgent need to prevent related information from leaking out due to negligence or internal bad management, or as a result of invasion by an external malignant group, so as to not only protect the privacy of client users from incurred fraud but also ensure that telecommunication information is protected against any theft.

SUMMARY OF THE INVENTION

A first object of the present invention is to provide an authentication system for screening network caller ID spoofs and malicious phone calls that includes a screening authentication system that functions to govern and coordinate overall operations of an associated server and all associated data elements included therein. The server is connected to the Internet or another telecommunications network to provide essential services across the network, either for private users inside a large organization or for public users via the Internet, in which case all input and output data may be made to comply with various protocols of the Internet. The server includes a login registration interface, a data accessing interface, a data searching and comparing program, a data searching database, a labeling indication program, a registry coding module, and a data searching coding module therein. The login registration interface, which is disposed in the server of the screening authentication system, provides fields for a telephone number and configured caller login identification data (ID) to be input by any network calling user. The telephone number and configured caller login ID are immediately processed by an authentication procedure to verify proper use of the telephone number, and are then relayed to a registry coding module. The registry coding module is disposed in the server of the screening authentication system and generates authentication data for the caller's telephone number by applying preset coding rules to the received telephone number and configured caller login ID from the login registration interface. The registry coding module then stores partial or overall information on the authentication data of the caller's telephone number into a data searching database in the server of the screening authentication system in a joint data manner, and the data accessing interface, which is disposed in the server of the screening authentication system, extracts the caller's telephone number contained in the network calling signal and configured caller login ID contained in the network calling signal issued from the caller's sending device and then relays them to a data searching coding module. The data searching coding module, which is also disposed in the server of the screening authentication system, generates authentication data of the caller's telephone number and configured caller login ID contained in the network calling signal using the same preset coding rules applied by the registry coding module to the caller telephone number and the configured caller login ID contained in the data searching database, and then relays the generated authentication data of the caller's telephone number to the data searching and comparing program in the server of the screening authentication system. The data searching and comparing program, which is disposed in the server of the screening authentication system, compares the authentication data of the caller's telephone number contained in the network calling signal from the data searching coding module with corresponding authentication data of the caller's telephone number stored in the data searching database in the server of the screening authentication system. The data searching database, which is disposed in the server of the screening authentication system, stores each authentication data of the caller's telephone number of every network calling user obtained from the registry coding module; and the labeling indication program, which is disposed in the server of the screening authentication system, provides a labeling indication as a result of the foregoing comparison of authentication data of the caller's telephone number by the data searching and comparing program as a labeling signal to be sent to the network receiving callee.

Thus, the receiving callee can easily authenticate whether a caller ID shows a genuine or sham incoming telephone number so as to further detecting a fake caller ID by simply watching the corresponding labeling indication of "failed in authentication of network caller telephone number" in the field for displaying the caller's telephone number in the callee receiving device, so that the crime of fraudulent telephone calling can be effectively reduced.

A second object of the present invention is to provide an authentication system for screening network caller ID spoofs and malicious phone calls, which can effectively obviate invalid filtering and undue blocking issues. To overcome invalid filtering issues, dual screening authentication of configured data of a caller's login ID and caller's telephone number contained in a network calling signal is provided, which can substantially prevent caller ID spoofing fraud. To address the undue blocking issue, a fraudulent telephone call signal can still be sent with a corresponding "failed authentication" indication signal, and connected to the target receiving callee instead of being blocked even though it failed in screening authentication of the present invention, so that the telecommunication company can still charge the caller without negatively affecting operation revenue. Therefore, inconvenience to the public due to invalid filtering issues and industry protest resulting from undue blocking can be completely obviated. Thus, features of the present invention not only can effectively prevent the crime of telephone fraud, but also can eliminate objections to complying with anti-phone-fraud regulations.

A third object of the present invention is to provide an authentication system for screening network caller ID spoofs and malicious phone calls having benefits of simple and easy installation because the feature of authenticating the caller telephone number contained in a network calling signal via configured data of the caller login ID contained in network calling signal utilizes existing telecommunication infrastructure so that no extra auxiliary device is required to be set up in addition to the existing telephone facility for the user, and no extra auxiliary channel is required to be set up in addition to the existing telecommunication channel in practical usage, resulting in advantages of economy, system compatibility and communication efficiency.

A fourth object of the present invention is to provide an authentication system for screening network caller ID spoofs and malicious phone calls that counteracts caller ID spoofing resulting from arbitrary tampering with the caller's telephone number in the network calling signal by the telephone fraudster, and that eliminates internal management mischief resulting from embezzlement by the system operator(s) or an external malignant invasion. To accomplish this object, the present invention provides additional screening authentication on configured caller login ID in the network calling signal to authenticate whether the caller telephone number in the network calling signal is genuine or a sham and, upon detecting that the caller ID is a fake, adding a "failed authentication" label thereto. Thus, not only can network caller ID spoofing and malicious phone calls from a telephone fraud gangster or syndicate be effectively obviated, but in addition disadvantageous loopholes in existing authenticating and blocking mechanisms against overseas incoming telephone set up by the telecommunication company and ISP can be offset. Furthermore, the authentication data of the caller's telephone number, may be stored in a data searching database as converted data generated via preset coding rules implemented by a registry coding module and applied to the telephone number and configured data of the caller login ID caller in the network calling signal, thereby protecting the complete original telephone number and configured caller login ID input during registration, so that safety for the network calling user is effectively ensured.

A fifth object of the present invention is to provide an authentication system for screening network caller ID spoofs and malicious phone calls, which takes advantage of the security provided by a Distributed Data Acquisition and Control System (DACS) to enhance authentication reliability and effectiveness in order to avoid a distributed denial-of-service (DDoS) attack so that the safety of the telecommunication information for the network calling user is substantially reinforced and enhanced.

BRIEF DESCRIPTION OF THE DRAWINGS

FIG. 4 is a syntax example of a virtual calling signal Session Initiation Protocol (SIP) used in network communication sessions for the other preferred exemplary embodiment of the present invention.

DETAILED DESCRIPTION OF THE PREFERRED EMBODIMENTS

Figure 2:
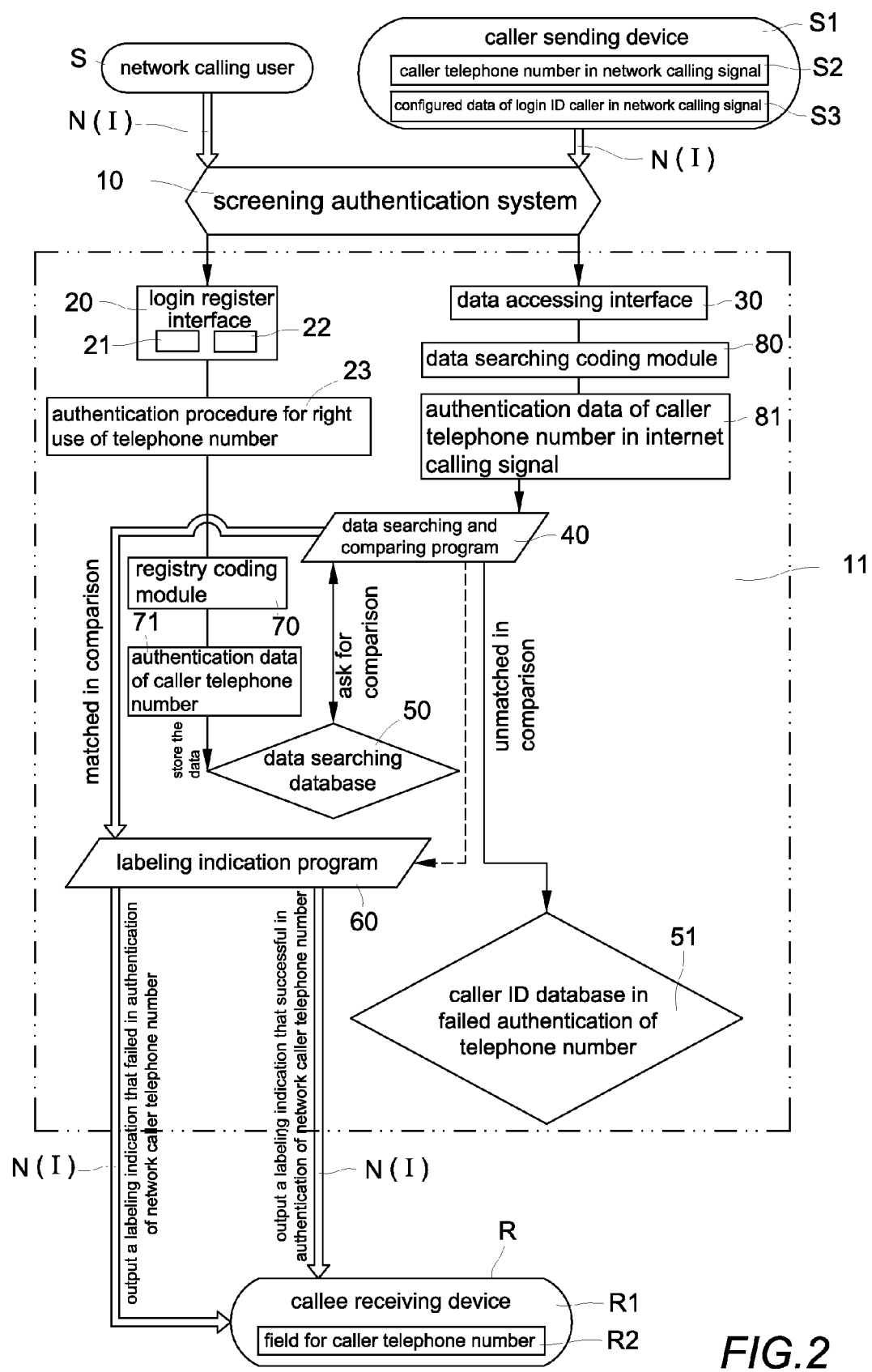
FIG. 2 is a systematic block diagram of processing function relationships for a preferred exemplary embodiment of the present invention.

Please refer to FIG. 2, which is a systematic processing block diagram for a preferred exemplary embodiment of an authentication method and system for screening network caller ID spoofs and malicious phone calls according to the present invention. The system includes a screening authentication (or verification) system 10 with a server 11. The screening authentication system 10 functions to govern and coordinate overall operations of the associated server 11 and all associated data elements included therein. The server 11 is connected with Internet I (or telecommunication network N) to provide essential services across the network, either for private users inside a large organization or for public users via the Internet I, such that all input and output data thereof comply with various protocols of the Internet I. The server provides a login registration interface 20, a data accessing interface 30, a data searching and comparing program 40, a data searching database 50, a caller ID database 51 for failed authentication (or verification) telephone numbers, a labeling indication program 60, a registry coding module 70 and a data searching coding module 80. The login registration interface 20, which is disposed in the server 11 of the screening authentication system 10, provides fields for input, by any calling user S, of a telephone number 21 and configured caller login identification data (ID) 22. The telephone number 21 and configured caller login ID 22 are immediately processed by an authentication (or verification) procedure 23 for proper or authorized use of telephone number 23, and then relayed to the registry coding module 70. The registry coding module 70, which is disposed in the server 11 of the screening authentication system 10, generates authentication data 71 of the caller telephone number via preset coding rules applied to the input telephone number 21 and the input caller login ID 22 from the login registration interface 20, and then stores partial or overall information on the authentication data 71 of the caller telephone number into the data searching database 50 in the server 11 of the screening authentication system 10 in a joint data manner. The data accessing interface 30, which is disposed in the server 11 of the screening authentication system 10, extracts a caller telephone number contained in a network calling signal S2 and configured caller login ID contained in a network calling signal S3 from the network calling signal issued by a caller sending device S1, and then relays them to the data searching coding module 80. The data searching coding module 80, which is disposed in the server 11 of the screening authentication system 10, generates authentication data of the caller telephone number contained in network calling signal 81 via the same preset coding rules as in the registry coding module 70 but applies the rules to the received caller telephone number contained in network calling signal S2 and to the configured caller login ID contained in network calling signal S3 from the data accessing interface 30. The data searching coding module 80 then relays the generated authentication data to the data searching and comparing program 40 in the server 11 of the screening authentication system 10. The data searching and comparing program 40, which is disposed in the server 11 of the screening authentication system 10, compares the authentication data of the caller telephone number contained in network calling signal 81 from the data searching coding module 80 with corresponding authentication data of caller telephone number 71 stored in the data searching database 50 in the server 11 of the screening authentication system 10. Data searching database 50, which is disposed in the server 11 of the screening authentication system 10, functions for storing authentication data for the caller telephone number 71 of every network calling user S that registers through the registry coding module 70. The labeling indication program 60, which is disposed in the server 11 of the screening authentication system 10, functions provides a labeling signal that indicates the result of the foregoing authentication data comparison by the data searching and comparing program 40 with respect to caller telephone number 71 and sends the labeling signal to the network receiving callee R. The authentication data of any caller telephone number contained in network calling signal 81 that fails authentication is also stored in a database of failed telephone number authentications for statistical analysis in the future and also so that attempts at network caller ID spoofing and malicious phone calls can be effectively screened in a well governed manner.

The labeling indication program 60 can be obtained by download via the Internet I or directly built-in by the manufacturer, and can be embedded in a callee receiving device R1 of a network receiving callee R instead of being disposed in the server 11 of the screening authentication system 10. Moreover, the corresponding labeling indication signal sent by the labeling indication program 60 can be arbitrarily selected from various combinations of character, symbol, audio or video for output so that handicapped people such as blind people or other people requiring special accommodations can understandingly perceive the corresponding labeling indication signal.

Figure 1:
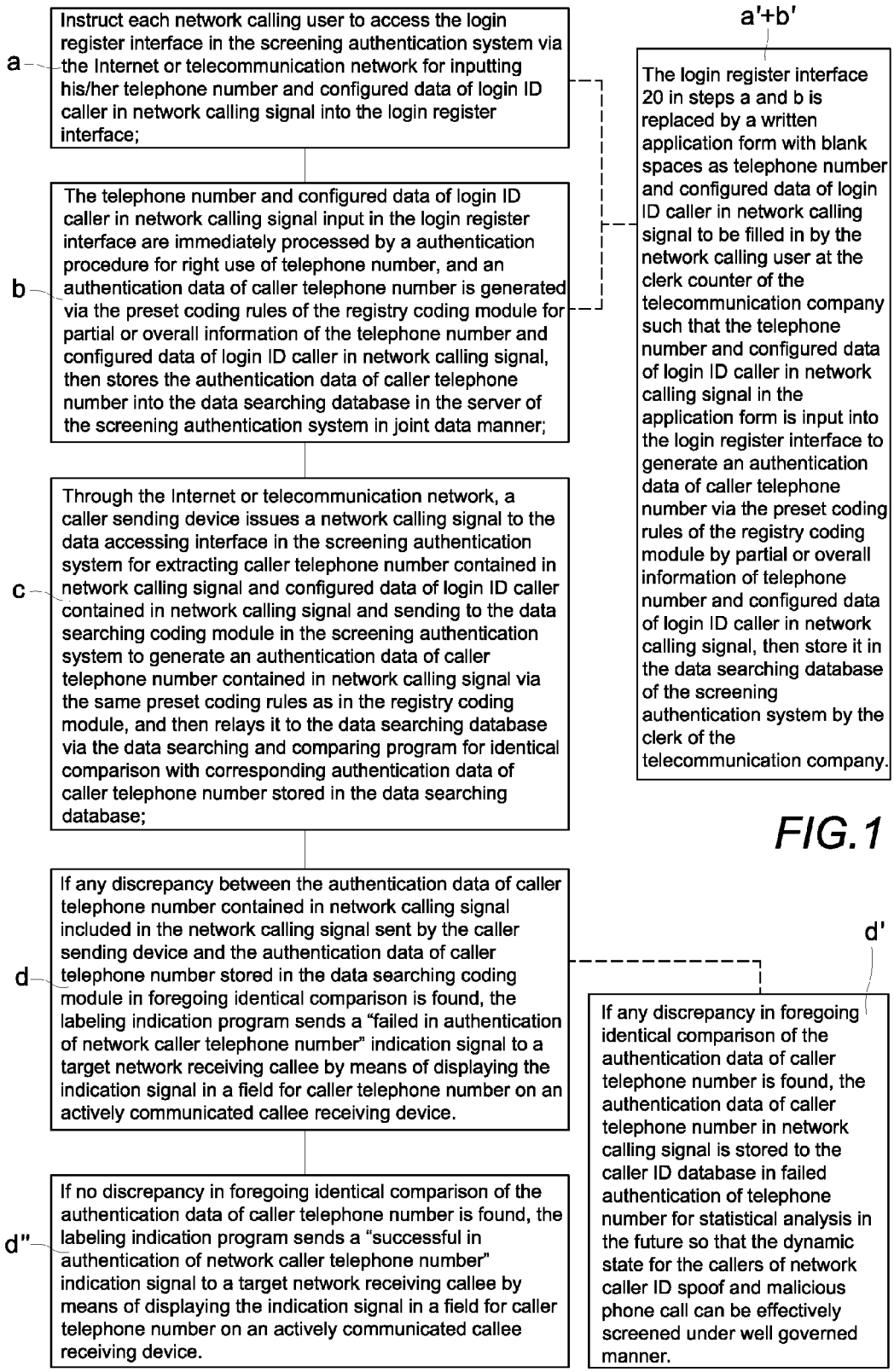
FIG. 1 is a flowchart of processing steps for a preferred exemplary embodiment of the present invention.

The authentication method carried out by the authentication system of FIG. 2 is illustrated in the flowchart of FIG. 1, which includes the following processing steps:

a. The first step is to instruct each network calling user S to access the login registration interface 20 in the screening authentication system 10 via the Internet I or telecommunication network N and input his/her telephone number 21 and caller login identification data (ID) 22 into the login registration interface 20.

b. The telephone number 21 and configured caller login ID 22 input in the login register interface 20 are immediately processed by an authentication procedure for proper use of telephone number 23, and caller telephone number authentication data 71 is generated via the preset coding rules of the registry coding module 70 applied to partial or overall information on the telephone number 21 and configured caller login ID. The registry coding module 70 then jointly stores the authentication data 71 of the caller telephone number and caller login ID into the data searching database 50 in the server 11 of the screening authentication system 10.

c. Through the Internet I or telecommunication network N, a caller sending device S1 issues a network calling signal to the data accessing interface 30 in the screening authentication system 10 for extracting the caller telephone number contained in network calling signal S2 and the configured login ID caller contained in network calling signal S3, and sending the caller telephone number and configured login ID to the data searching coding module 80 in the screening authentication system 10 to generate authentication data 81 via the same preset coding rules as are applied by the registry coding module 70. The coding module 80 then relays the authentication data 81 to the data searching database 50 via the data searching and comparing program 40 for comparison with corresponding authentication data 71 stored in the data searching database 50.

d. If any discrepancy between the authentication data 81 for the caller telephone number contained in the network calling signal sent by the caller sending device S1 and the authentication data for the caller telephone number 71 stored in the data searching coding module 50 is found, the labeling indication program 60 sends a "failed in authentication of network caller telephone number" indication signal to a target network receiving callee R by displaying the indication signal in a field for the caller telephone number R2 on an actively communicated callee receiving device R1 to alert the network receiving callee R to take precautions.

Step d further comprises a sub-step d' that If in which, if any discrepancy between the authentication data 81 for the caller telephone number included in the network calling signal sent by the caller sending device S1 and the authentication data 71 for the caller telephone number 71 stored in the data searching coding module 50 is found, the authentication data 81 is stored to the failed caller ID authentication database 51 for statistical analysis and so that callers using network caller ID spoofing and malicious phone calls can be effectively screened in a well governed manner.

Step d further comprises a sub-step d" in which, if no discrepancy between the network calling signal authentication data 81 and the registered authentication data 71 stored in the data searching coding module 50 is found, the labeling indication program 60 sends a "successful in authentication of network caller telephone number" indication signal to the target network receiving callee R by displaying the indication signal in the field for the caller telephone number R2 on an actively communicated callee receiving device R1 so that the network receiving callee R can feel safe to receive the telephone call.

In all of foregoing steps, the telephone number 21 denotes a telephone number of a local fixed-line system or a cellular system, while the configured caller login identification data (ID) 22 is preset by each network calling user S.

The login registration interface 20 in steps a and b can be replaced by a written application form with blank spaces for telephone number 21 and configured caller login identification data 22 to be filled in by the network calling user S at the clerk counter of the telecommunication company, such that the telephone number 21 and configured caller login ID 22 in the application form is input into the login register interface 20 to generate authentication data 71 via the preset coding rules of the registry coding module 70. The authentication data 71 is then stored in the data searching database 50 of the screening authentication system 10 by the clerk of the telecommunication company.

Alternatively, the registration of the network calling user S into the screening authentication system 10 via the login register interface 20 in step a can also be finished by input via a proprietary direct-dial voice line, fixed-line or value-added mobile website.

Furthermore, the telecommunication network N in steps a and c may include a PSTN (Public Switched Telephone Network) used in a fixed-line telephone system, a GSM system (Global System for Mobile Communications) used in a cellular telephone system, a TDMA system (Time Division Multiple Access), a CDMA system (Code Division Multiple Access), a PDC system (Personal Digital Cellular) and various telecommunication networks related to IP (Internet Protocol) telecommunication such as ADSL (Asymmetric Digital Subscriber Line), Fiber-Optic, WiMAX (Worldwide Interoperability for Microwave Access), LTE (Long Term Evolution) and the like, with each telecommunication network being mutually connected with the Internet I respectively. As a result, any call over the Internet I can also be performed via telecommunication network N to achieve duplex transmission between the network calling user S and network receiving callee R.

Accordingly, a telephone fraudster will be unable to get the correct configured caller login ID caller in a network calling signal 22 of the network calling user S even though he/she is able to create a fake telephone number 21. Any calling telephone via the Internet I will be directly sent to the data searching coding module 80 via the data accessing interface 30 linked by the telecommunication network N, to generate authentication data 81 for the caller telephone number contained in the network calling signal via the same preset coding rules as in the registry coding module 70, and then relay the authentication data 81 to the data searching database 50 via the data searching and comparing program 40 for comparison with corresponding authentication data 71 stored in the data searching database 50. The fake telephone number 21 without correctly configured caller login identification data in network calling signal 22 issued by the telephone fraudster will fail the identity comparison, at which time the labeling indication program 60 can send a "failed in authentication of network caller telephone number" indication signal to the target network receiving callee R by displaying the indication signal in a field for the caller telephone number R2 on an actively communicated callee receiving device R1, and thereby alert the network receiving callee R of the failed authentication. Thus, the network receiving callee R can easily judge whether the incoming telephone number of the caller is a fraudulent telephone number by visually checking the display on the field for the caller telephone number R2, without the need to take the trouble to ask for confirmation via a proprietary anti-fraud phone number 165 or criminal case-report phone number 110 set by the government, and therefore the crime of fraudulent telephone calling can be effectively stopped before any harm is done.

Meanwhile, the telephone call labeled "failed in authentication of network caller telephone number" can still be connected to the target network receiving callee R instead of being blocked, even though it failed the screening authentication, so that the telecommunication company can still charge the caller without complaint about an undue blocking issue. Thus, promotion of the present invention not only can effectively prevent the crime of telephone fraud, but it also can counter negative attitudes that have hindered compliance with anti-phone-fraud regulation.

Still further, the authentication data 71 stored in the data searching database 50 is converted data rather than original partial or overall information about the caller telephone number 71, the converted data being generated via the preset coding rules of the registry coding module 70 from the telephone number 21 and configured caller login ID 22 of the network calling user S input during registration so that the risk exposing the genuine telephone number and genuine telecommunication information of the network calling user S is also effectively eliminated, in addition to effectively eliminating the risk of telephone fraud.

Figure 3:
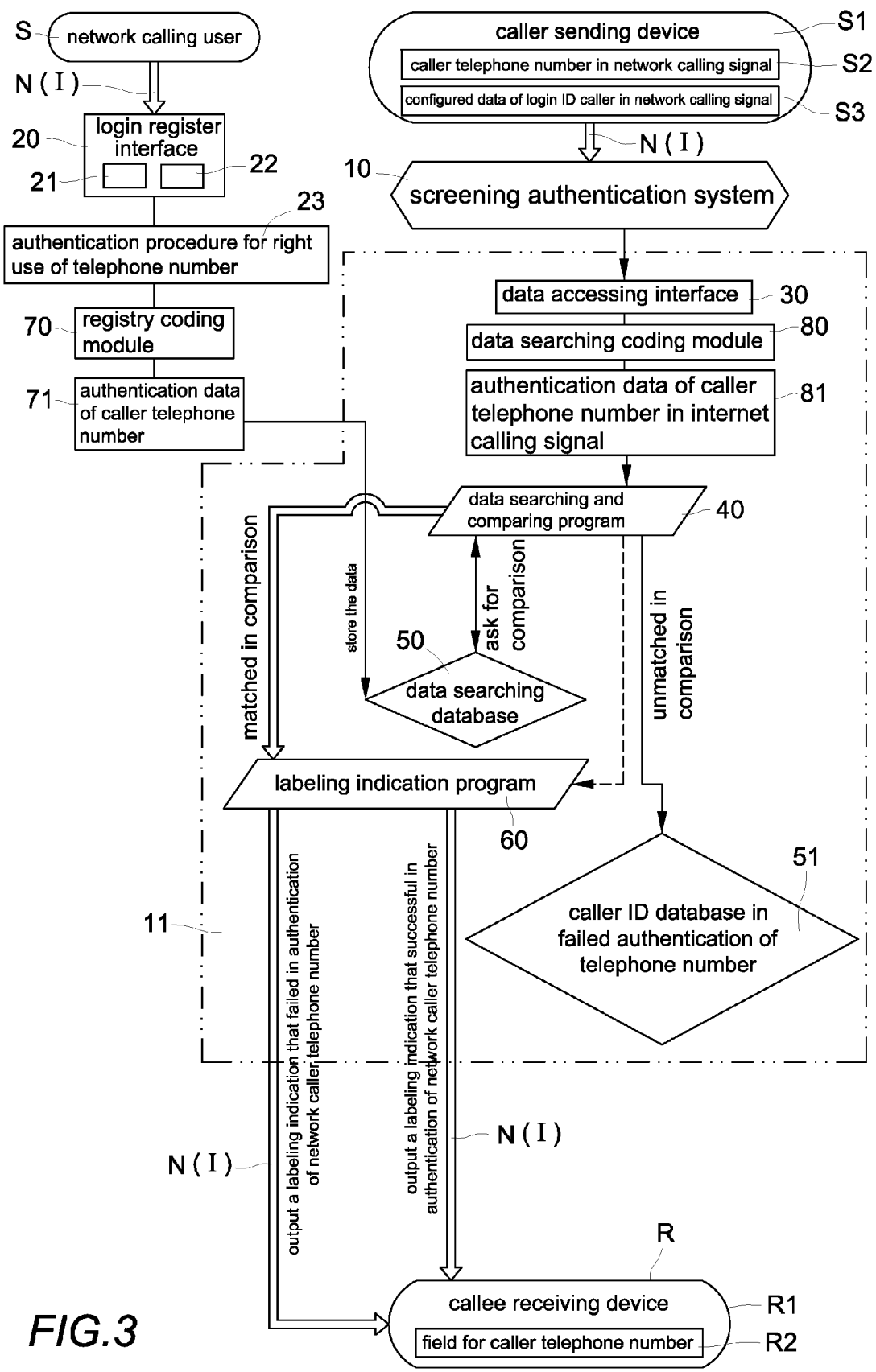
FIG. 3 is another systematic block diagram of processing function relationships in another preferred exemplary embodiment of the present invention.

FIG. 3 is another systematic block diagram showing functional relationships in another preferred exemplary embodiment of the authentication method and system for screening network caller ID spoofs and malicious phone calls of the present invention. Here, the login registration interface 20 and registry coding module 70 are disposed in a server of another external computer(s) outside of the server 11 of the screening authentication system 10, and connected to the server 11 via the Internet I. In a practical process, the login registration interface 20 sends the registered the telephone number 21 and configured login identification data for the caller 22 to the registry coding module 70 via the authentication procedure to verify proper use of telephone number 23. The registry coding module 70 generates authentication data 71 for the caller telephone number via preset coding rules applied to the telephone number 21 and configured caller login ID 22 received from the login registration interface 20, and then stores partial or overall information of the authentication data 71 in the data searching database 50 of server 11 of the screening authentication system 10 via the Internet I.

Please refer to FIG. 4, which is a syntax example of a virtual calling signal of the Session Initiation Protocol (SIP) used in network communication sessions according to an authentication method and system for screening network caller ID spoofs and malicious phone calls using a Session Initiation Protocol (SIP) that may be used in connection with the preferred exemplary embodiments of the present invention. As illustrated, the data "0922222222" in the field "From" of line 6 refers to a position of the caller telephone number contained in network calling signal S2, which is to be extracted by the data accessing interface 30 of the present invention, and a position of the field for the caller telephone number R2 in the callee receiving device R1, which is to be sent by the labeling indication program 60 of the present invention. The data "111.222.333.442" in the field "Via" of line 3 denotes an address for the server of Session Initiation Protocol (SIP) while the data "111.222.333.441" in the field "Via" of line 4 denotes an address for the terminal device of Session Initiation Protocol (SIP), and the data "222" in the field "Contact" of line 8 denotes a caller ID of Session Initiation Protocol (SIP). All four of the foregoing data are combined into joint data for referring to a common position of the SIP configured caller login data contained in network calling signal S3, which is also to be extracted by the data accessing interface 30 of the present invention.

The data in the field "From" of line 6 may be easily tampered by a malicious caller, but the data in the field "Via" of line 4, which is an address for the terminal device of the Session Initiation Protocol (SIP), and the data in the field "Contact" of line 8, which is a caller ID of the Session Initiation Protocol (SIP), cannot be arbitrarily changed and therefore cannot be tampered with.

Once the screening authentication system 10 is initiated, the processes will be automatically performed as below: Firstly, the data accessing interface 30 will extract the caller telephone number contained in network calling signal S2 in accordance with the data in the field "From" of line 6, and configured caller login identification data contained in network calling signal S3 in accordance with the joint data that includes a combination of the data in the field "Contact" of line 8 and the data in the field "Via" of line 3 or the data in the field "Via" of line 4. Secondly, the caller telephone number contained in network calling signal S2 and configured caller login ID contained in network calling signal S3 will be sent to the data searching and comparing program 40 for comparison to obtain an authentication result with a corresponding labeling indication signal. Thirdly, the labeling indication program 60 will send the authentication result with the corresponding labeling indication signal to the target field for caller telephone number R2 in the target callee receiving device R1, for displaying the corresponding labeling indication signal in accordance with the data in the field "From" of line 6. Finally, if the result of the screening authentication is "failed authentication," the labeling indication program 60 will also store the joint data of the caller telephone number contained in network calling signal S2 and configured caller login ID contained in network calling signal S3 into the caller ID database 51 of telephone numbers that fail authentication.

In summary, in order to counteract telephone fraud by caller ID spoofing through arbitrary tampering with caller telephone number information in a network calling signal, the present invention provides additional screening authentication on configured data of caller login identification data in the network calling signal to authenticate whether the caller telephone number in the network calling signal is genuine or a sham, and labeling fake caller ID with a "failed authentication" indicator. Thus, network caller ID spoofs and malicious phone calls from a telephone fraud gangster or syndicate be effectively eliminated while also closing disadvantageous loopholes in existing authenticating and blocking mechanisms for overseas incoming telephone calls that have been set up by telecommunication companies and international ISPs. Moreover, the feature of authenticating the caller telephone number contained in a network calling signal S2 via configured caller login identification data contained in a network calling signal S3 in the screening authentication system 10 of the present invention is implemented using infrastructure of the existing telecommunication facility, so that no extra auxiliary device is required to be set up other than the existing telephone facility, and no extra auxiliary channel is required to be set up in addition to the existing telecommunication channel, resulting in favorable economic effect, system compatibility and communication efficiency. Still further, the authentication data 71 stored in the data searching database 50 is converted data generated via the preset coding rules of the registry coding module 70 from the telephone number 21 and configured caller login ID 22 instead of the complete original telephone number 21 and configured login ID 22 of the network calling user S input during registration so that safety for the telecommunication information of the network calling user S is effectively ensured. Finally, the present invention may utilize the security advantage provided by the Distributed Data Acquisition and Control System (DACS) to enhance authentication reliability and effectiveness and avoid distributed denial-of-service (DDoS) attacks, so that the safety of the telecommunication information of the network calling user S is substantially reinforced and enhanced.

Accordingly, we submit the patent application for the present invention in accordance with related patent laws as it meets essential criterion of patentability.

What is claimed is:

1. An authentication system for screening network caller ID spoofs and malicious phone calls, comprising:
   a login register interface for inputting a caller telephone number and caller login identification data;
   a registry coding module for generating first authentication data, according to preset coding rules, from the input caller telephone number and configured input caller login identification data input, and for storing the first authentication data in a data searching and comparing database; and
   a server including:
      a data accessing interface for receiving a network calling signal from a caller sending device, the network calling signal including a configured corresponding caller telephone number and a corresponding caller login identification data;
      a data searching coding module for generating second authentication data, according to said preset coding rules, from the received network calling signal including the configured corresponding caller telephone number and the configured corresponding caller login identification data;
      a data searching and comparing program implemented by a processor in the server for comparing the first authentication data stored in the data searching database and the second authentication data in the received network calling signal; and
      a labeling indication program implemented by a processor in the server for sending a failed authentication indication to a callee receiving device if the first identification data does not match the second identification data.

2. The authentication system for screening network caller ID spoofs and malicious phone calls as claimed in claim 1, wherein the login registration interface and the registry coding module are included in said server.

3. The authentication system for screening network caller ID spoofs and malicious phone calls as claimed in claim 1, wherein the login registration interface and the registry coding module are disposed in an external computer connected to said server via the Internet.

4. The authentication system for screening network caller ID spoofs and malicious phone calls as claimed in claim 1, further comprising a caller ID database for storing information concerning telephone numbers that have failed authentication.

5. The authentication system for screening network caller ID spoofs and malicious phone calls as claimed in claim 1, further comprising the step of displaying a failed authentication indicator in a caller telephone number field of receiving device of the callee.

6. The authentication system for screening network caller ID spoofs and malicious phone calls as claimed in claim 1, wherein the labeling indication program is obtained by download via the Internet or directly built-in by a manufacturer, and is embedded in a callee receiving device of network receiving callee, and the indication corresponding to failed authentication is displayed in the caller telephone number field of the callee receiving device or in other ways to notice the callee.

7. The authentication system for screening network caller ID spoofs and malicious phone calls as claimed in claim 1, wherein said authentication system is a Session Initiation Protocol (SIP) system and said configured caller login identification data is SIP caller login identification data.

8. An authentication method for screening network caller ID spoofs and malicious phone calls, comprising the steps of:
   a. instructing each network calling user to input his/her caller telephone number and configured caller login identification data;
   b. processing the input caller telephone number and configured caller login identification data to verify proper use of the input telephone number, and generating first authentication data via preset coding rules from the input caller telephone number and the configured input caller identification data, and then storing the first authentication data in a data searching database;
   c. through the Internet or a telecommunication network, receiving a network calling signal from a caller sending device and extracting a corresponding caller telephone number contained in the network calling signal and corresponding configured caller login identification data also contained in the network calling signal; sending to the extracted corresponding caller telephone number and extracted configured caller login identification data to a data searching coding module to generate second authentication data according to the same preset coding rules used to generate the first authentication data; and then comparing the first authentication data stored in the data searching database and the second authentication data generated from the received network calling signal; and
   d. if any discrepancy between the first authentication data and the second authentication data is found, sending a failed authentication indication signal to a target network receiving callee.

9. The authentication method for screening network caller ID spoofs and malicious phone calls as claimed in claim 8, wherein step d further comprises a sub-step d' of, if any discrepancy between the first and second authentication data is found, storing the data related to the second authentication data in a failed-authentication caller ID database.

10. The authentication method for screening network caller ID spoofs and malicious phone calls as claimed in claim 8, wherein step d further comprises a sub-step d" of, if no discrepancy between the first and second authentication data is found, sending a successful authentication indication signal to a target network receiving callee.

11. The authentication method for screening network caller ID spoofs and malicious phone calls as claimed in claim 8, further comprising the step of, if a discrepancy between the first and second authentication data is found, completing the telephone call so that the caller is still charged for the telephone call.

12. The authentication method for screening network caller ID spoofs and malicious phone calls as claimed in claim 8, wherein each telephone number in steps a, b, c and d is a telephone number of a local fixed-line system, a telephone number of a cellular system, a registered ID of an network communication, or a combination of characters, numerals or symbols.

13. The authentication method for screening network caller ID spoofs and malicious phone calls as claimed in claim 8, wherein each configured caller login identification data in steps a, b, c and d includes a device address of a network call, a registered ID of a network call, a server address of a network call, a communication port of a network call, or information that enables a network calling device to successfully send and receive a network calling signal via the Internet.

14. The authentication method for screening network caller ID spoofs and malicious phone calls as claimed in claim 8, wherein the caller telephone number and configured caller login identification data are input by the network calling user through a login registration interface via an Internet or network connection.

15. The authentication method for screening network caller ID spoofs and malicious phone calls as claimed in claim 8, wherein the caller telephone number and configured caller login identification data are input by the network calling user via a written application form with blank spaces for the input caller telephone number and the input configured caller login identification data and then transmitted by a telecommunications company to a login registration interface for further processing.

16. The authentication method for screening network caller ID spoofs and malicious phone calls as claimed in claim 8, wherein the authentication procedure to verify proper use of the input telephone number in step b is performed by a telecommunication sending/receiving mechanism of a telecommunication device corresponding to the input telephone number.

17. The authentication method for screening network caller ID spoofs and malicious phone calls as claimed in claim 8, wherein the network calling signal is a signal for transmitting voice, video, characters and/or symbols.

18. The authentication method for screening network caller ID spoofs and malicious phone calls as claimed in claim 8, wherein the telecommunication network in steps a and c includes at least one of a PSTN (Public Switched Telephone Network) used in a fixed-line telephone system, a GSM system (Global System for Mobile Communications) used in a cellular telephone system, a TDMA system (Time Division Multiple Access), a CDMA system (Code Division Multiple Access), a PDC system (Personal Digital Cellular), and various telecommunication networks related to IP (Internet Protocol) telecommunication.

19. The authentication method for screening network caller ID spoofs and malicious phone calls as claimed in claim 18, wherein the various telecommunication networks related to IP include at least one of an ADSL (Asymmetric Digital Subscriber Line) system, Fiber-Optic network system, WiMAX (Worldwide Interoperability for Microwave Access) system, and LTE (Long Term Evolution) system.

20. The authentication method for screening network caller ID spoofs and malicious phone calls as claimed in claim 7, wherein said authentication system is a Session Initiation Protocol (SIP) system and said configured caller login identification data is SIP caller login identification data.

21. The authentication method and system for screening network caller ID spoofs and malicious phone calls as claimed in claim 20, wherein each SIP caller login identification data in steps a, b, c and d includes a SIP terminal address, a registered SIP ID, a SIP server address, a SIP communication port, or information that enables a SIP device to successfully send and receive network calling signals via the Internet.

22. The authentication method and system for screening network caller ID spoofs and malicious phone calls as claimed in claim 20, wherein the SIP caller login identification data extracted from the network calling signal is obtained from fields of "Via" and "Contact" in the calling signal of the SIP used in network communication sessions.

23. The authentication method and system for screening network caller ID spoofs and malicious phone calls as claimed in claim 20, wherein a caller telephone number extracted from the network calling signal is obtained from a field of "From" in the calling signal of the SIP used in network communication sessions.

24. The authentication method and system for screening network caller ID spoofs and malicious phone calls as claimed in claim 20, wherein a labeling indication corresponding to the caller telephone number is extracted from an SIP field of "From" in the network calling signal used in network communication sessions.

* * * * *